United States Patent
Steininger

(10) Patent No.: US 12,317,786 B2
(45) Date of Patent: Jun. 3, 2025

(54) APPARATUS FOR CUTTING AND/OR HANDLING MATERIAL TO BE CUT

(71) Applicant: Werner Steininger, Peuerbach (AT)

(72) Inventor: Werner Steininger, Peuerbach (AT)

( * ) Notice: Subject to any disclaimer, the term of this patent is extended or adjusted under 35 U.S.C. 154(b) by 686 days.

(21) Appl. No.: 17/769,034

(22) PCT Filed: Jun. 24, 2020

(86) PCT No.: PCT/EP2020/067736
§ 371 (c)(1),
(2) Date: Apr. 14, 2022

(87) PCT Pub. No.: WO2021/083560
PCT Pub. Date: May 6, 2021

(65) Prior Publication Data
US 2023/0022230 A1     Jan. 26, 2023

(30) Foreign Application Priority Data

Oct. 30, 2019   (AT) .............................. A 50935/2019

(51) Int. Cl.
*A01G 23/08*     (2006.01)
*A01G 23/00*     (2006.01)
(Continued)

(52) U.S. Cl.
CPC ............. *A01G 23/08* (2013.01); *A01G 23/00* (2013.01); *B25J 5/007* (2013.01); *B60P 1/5433* (2013.01); *B60P 3/41* (2013.01); *B66C 1/585* (2013.01)

(58) Field of Classification Search
CPC ...... A01G 23/08; A01G 23/00; A01G 23/006; A01G 23/083; A01G 23/095; B66C 1/585;
(Continued)

(56) References Cited

U.S. PATENT DOCUMENTS 3,868,982 A     3/1975   Kurelek et al.
4,063,359 A  *  12/1977  Luscombe ............... A01G 3/08
                                                       144/34.1
(Continued)

FOREIGN PATENT DOCUMENTS

CN     204111218     1/2015
CN     107651582     2/2018
(Continued)

OTHER PUBLICATIONS

Int'l Search Report (Form PCT/ISA/210) conducted in Int'l Application No. PCT/EP2020/067736 (Sep. 14, 2020).
(Continued)

*Primary Examiner* — Jared O Brown
(74) *Attorney, Agent, or Firm* — GREENBLUM & BERNSTEIN, P.L.C.

(57) ABSTRACT

An apparatus for cutting and/or handling material to be cut, in particular trees, having a pivotable boom arm to which a gripping or cutting head is attached. The boom arm includes a rotatable crane pillar, a first boom pivotably mounted on the rotatable crane pillar about a first pivot axis, a second boom pivotably mounted on the first boom about a second pivot axis. The gripping or cutting head is pivotably mounted on the second boom about a third pivot axis, and a controllable pivoting device is provided, by which the gripping or cutting head can be pivoted about the third pivot axis from a folded-out working position, in which the gripping or cutting head is mounted in front of the second boom, into a folded-in storage position, in which the gripping or cutting head is arranged to the side of the second boom.

12 Claims, 4 Drawing Sheets

Figure 1A:
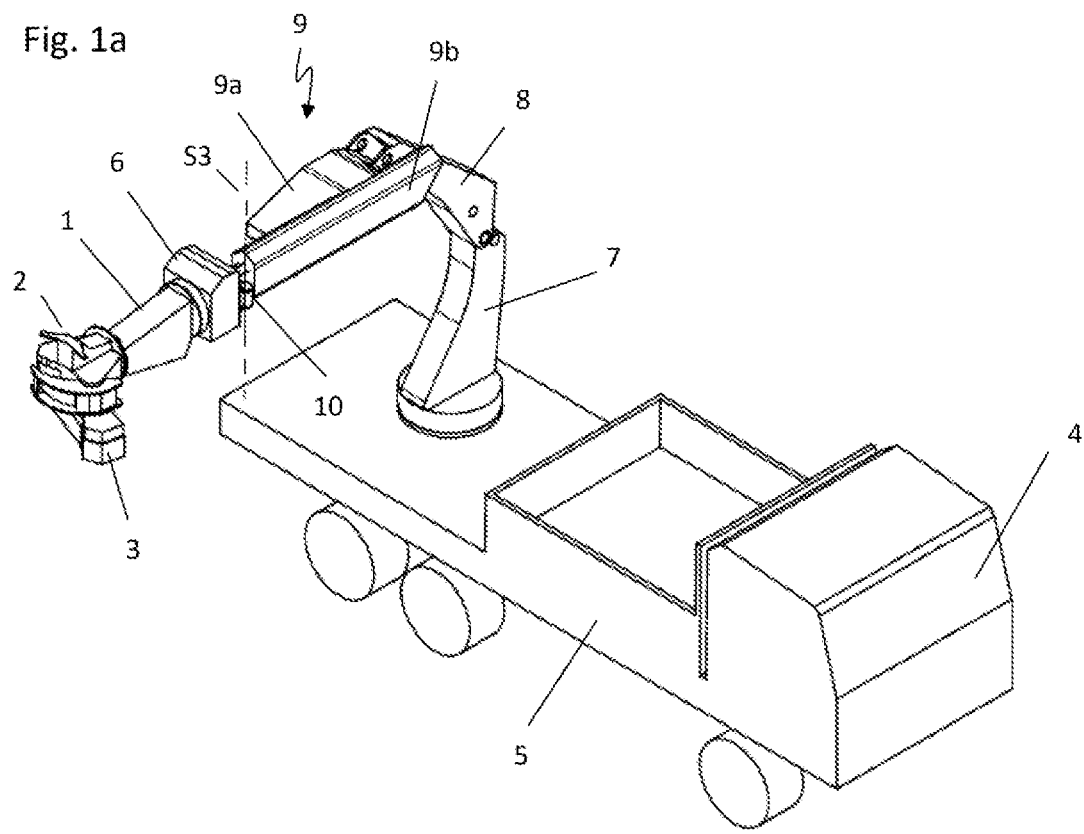

(51) Int. Cl.
   *B25J 5/00*      (2006.01)
   *B60P 1/54*      (2006.01)
   *B60P 3/41*      (2006.01)
   *B66C 1/58*      (2006.01)

(58) Field of Classification Search
   CPC .. B60P 1/5433; B60P 3/41; B25J 5/007; B25J 5/06
   See application file for complete search history.

(56) References Cited

U.S. PATENT DOCUMENTS

| | | | | |
|---|---|---|---|---|
| 4,659,276 A | * | 4/1987 | Billett | B60P 1/5433 |
| | | | | 212/251 |
| 5,106,255 A | * | 4/1992 | Motoda | B66C 23/44 |
| | | | | 212/277 |
| 2011/0024211 A1 | | 2/2011 | Kikuchi | |
| 2014/0205413 A1 | | 7/2014 | Nakamura et al. | |
| 2019/0373826 A1 | * | 12/2019 | Tossavainen | B66C 15/045 |

FOREIGN PATENT DOCUMENTS

| | | | |
|---|---|---|---|
| EP | 2 749 714 | | 7/2014 |
| JP | S5974894 A | * | 4/1984 |
| JP | S61127596 | | 6/1986 |
| JP | H09227073 | | 9/1997 |
| KR | 100970131 | | 7/2010 |
| WO | 02/45482 | | 6/2002 |

OTHER PUBLICATIONS

Int'l Written Opinion (Form PCT/ISA/237) conducted in Int'l Application No. PCT/EP2020/067736 (Sep. 14, 2020).

\* cited by examiner

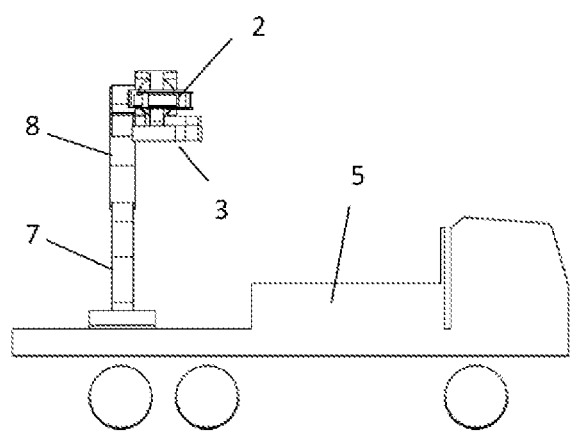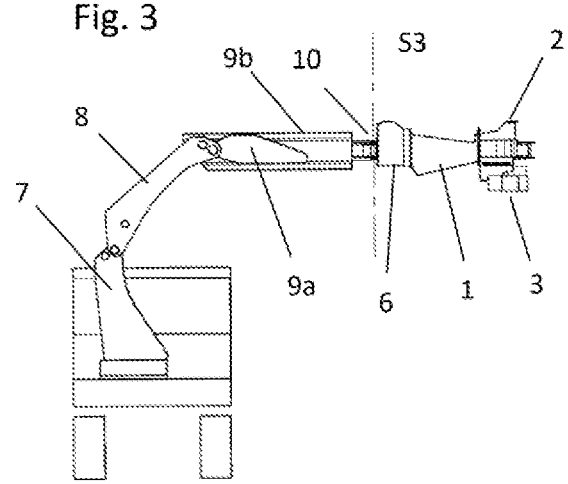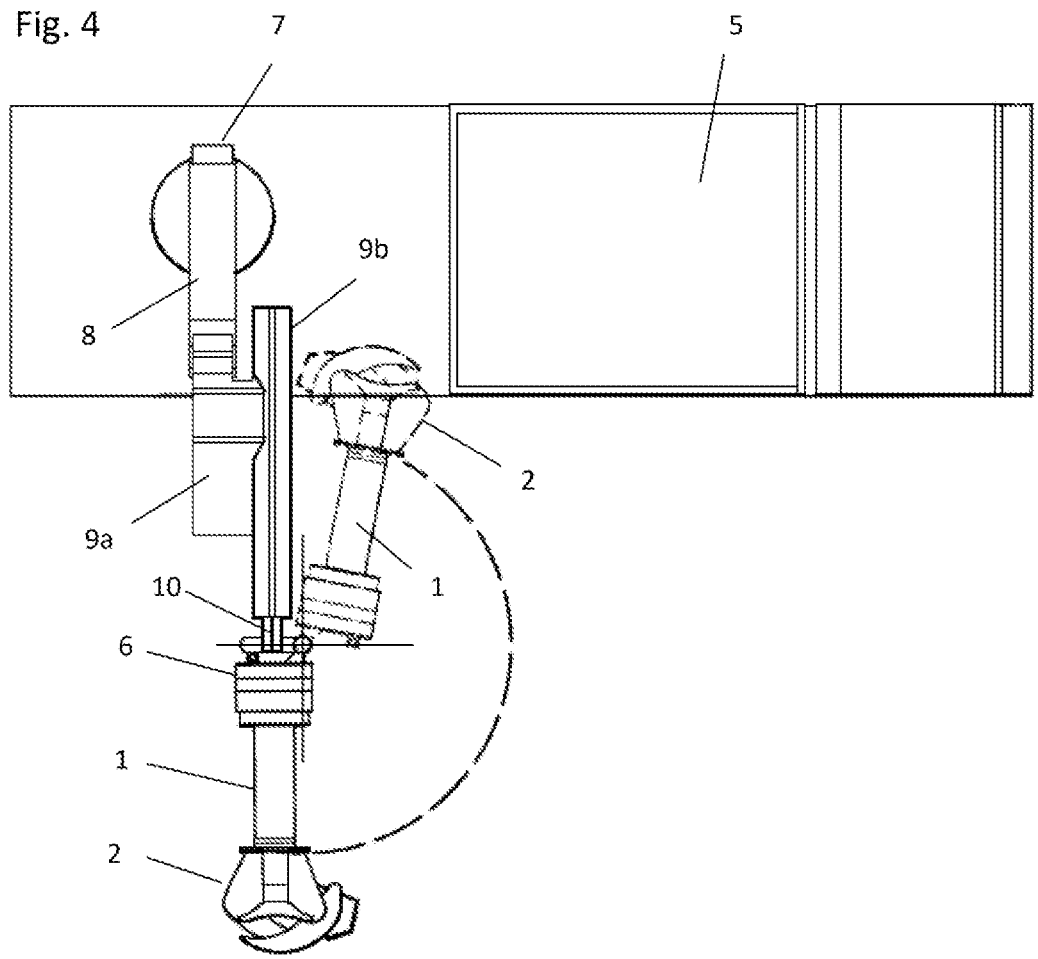

Fig. 6
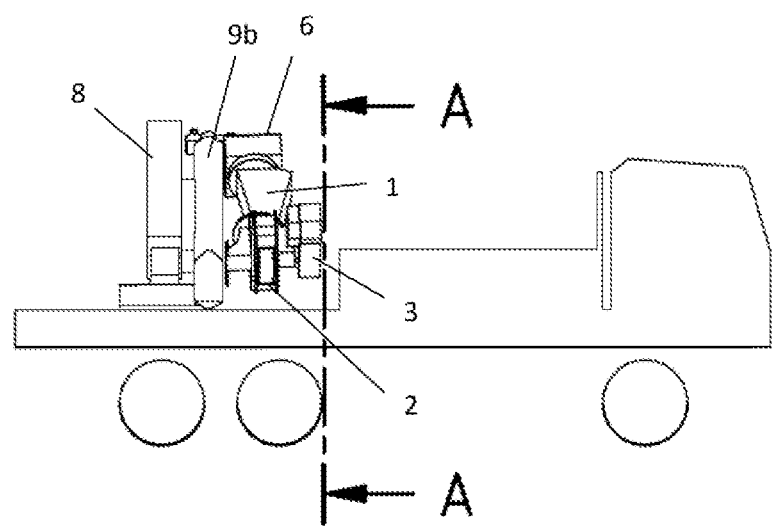
Fig. 7
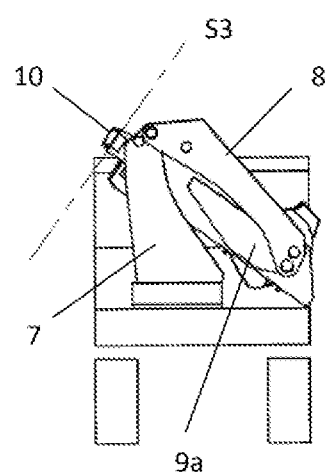
Fig. 8
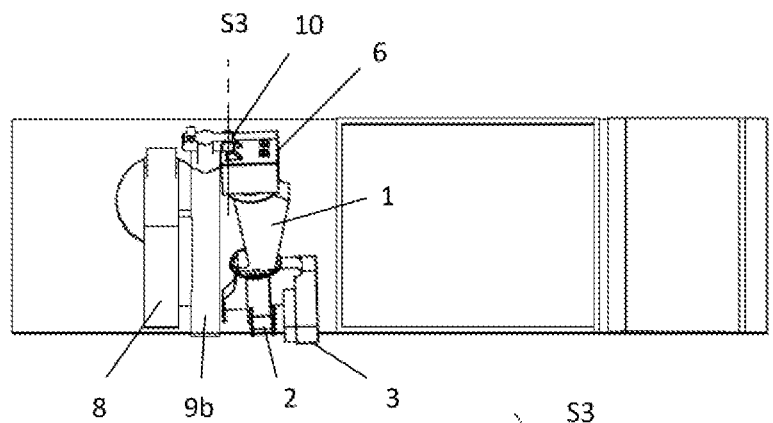
Fig. 9   A-A
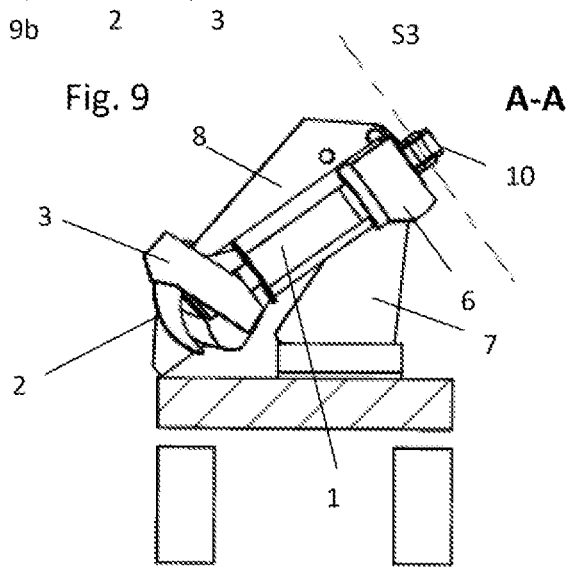

APPARATUS FOR CUTTING AND/OR HANDLING MATERIAL TO BE CUT

The invention relates to an apparatus for cutting and/or handling material to be cut, in particular trees, having a pivotable boom arm to which a gripping or cutting head is attached, according to the preamble of claim 1.

In the timber industry and forestry, for example, machines are used for cutting and/or loading trees. These machines have a pivoting boom arm with a gripping or cutting head attached to it, with the help of which tree trunks can be gripped and cut through or handled for loading work. The boom arm has hydraulic actuators by which the boom arm can be pivoted. The gripping or cutting head has a gripper whose gripping arms can be opened and closed with further hydraulic actuators. The gripper or cutting head is also usually equipped with a cutting mechanism that performs the cutting operation with additional hydraulic actuators. The cutting mechanism may, for example, be in the form of a power saw that is movable relative to the gripper, or in the form of a cutting plate to accomplish cutting through the gripped tree trunks. Subsequently, in a combined operation of the boom arm and the gripping or cutting head, the apparatus can either lay the tree aside, load it onto a transport vehicle, or feed it to a machine for shredding or further processing.

Apparatuses of the type mentioned are designed to be able to perform movements that are as expansive as possible in order to have a large radius of action that is advantageous for practical work. However, they have the disadvantage of requiring a large amount of space even when inactive, which causes difficulties when storing and transporting the device. Moreover, the expansive design of such devices in known embodiments entails that dedicated working machines are provided for these apparatuses in order to be able to move and use these apparatuses at their places of operation. However, it would be desirable if said apparatus could also be mounted, for example, on a truck with which the apparatus can be transported. At the place of use, the apparatus could be used not only to cut trees, but also to load them directly onto the truck, thus avoiding the use of different vehicles and simplifying the whole operation.

It is therefore the object of the invention to provide an apparatus for cutting and/or handling material to be cut, in particular trees, having a gripping or cutting head attached to a pivoting boom arm, which on the one hand can perform expansive movements in use, but on the other hand can also be arranged to be as compact and space-saving as possible for storage and transport.

This object is achieved by an apparatus for cutting and/or handling material to be cut, in particular trees, comprising a pivotable boom arm to which a gripping or cutting head is attached. According to the invention, it is proposed for this purpose that the boom arm comprises a rotatable crane pillar, as well as a first boom which is pivotably mounted on the rotatable crane pillar about a first pivot axis, as well as a second boom which is pivotably mounted in a first end region of the second boom on the first boom about a second pivot axis, wherein the first and second pivot axes are arranged parallel to one another and perpendicular to longitudinal axes of the first, and second booms, and at a second end region of the second boom remote from the first end region the gripping or cutting head is pivotably mounted on the second boom about the third pivot axis and a controllable pivoting device is provided, by means of which the gripping or cutting head can be pivoted about the third pivot axis from a folded-out working position, in which the gripping or cutting head is positioned in front of the second end region, as seen in the longitudinal axial direction of the second boom, into a folded-in storage position, in which the gripping or cutting head is arranged to the side of the second boom.

The boom arm according to the invention thus has three elements, namely a rotatable crane pillar, a first boom and a second boom. The two booms are each pivotable about mutually parallel pivot axes arranged perpendicular to longitudinal axes of the first and second booms, wherein the first and second pivot axes will generally extend substantially horizontal as well as perpendicular to the axis of rotation of the rotatable crane pillar. The booms can thus be arranged in a stretched configuration relative to each other, allowing for expansive movements of the boom arm, or they can be laid end to end to adopt space-saving configurations for transportation and storage. In particular, it is possible, for example, to pivot the second boom under the first boom. In order to be able to make improved use of this type of storage, it is further proposed in accordance with the invention that the gripping or cutting head arranged on the second boom is mounted on the second boom so as to be pivotable about a third pivot axis, and a controllable pivoting device is provided, by means of which the gripping or cutting head can be pivoted about the third pivot axis from a folded-out working position, in which the gripping or cutting head is positioned in front of the second end region, as viewed in the longitudinal axial direction of the second boom, into a folded-in storage position, in which the gripping or cutting head is arranged to the side of the second boom. This makes it possible, after completion of the work, to first bring the gripping or cutting head, with the aid of the pivoting device, into a folded-in storage position in which the gripping or cutting head is arranged to the side of the second boom. Subsequently, the second boom can be pivoted under the first boom, wherein this movement is no longer obstructed due to the lateral arrangement of the gripping or cutting head. Thus, a compact arrangement is achieved in which the second boom is located below the first boom and with its second end region in the vicinity of the rotatable crane pillar, and the gripping or cutting head is arranged adjacent to the first and second booms.

The pivot angle of the pivoting movement of the gripping or cutting head from the working position to the storage position is preferably between 135° and 180°, so that the gripping or cutting head, which in the working position protrudes over the second boom in the longitudinal direction, touches or almost touches the second boom laterally in the storage position. The gripping or cutting head is thus folded laterally against the second boom in the storage position.

With regard to the second boom, it is preferably proposed that the second boom comprises a first boom part having the first end region, and a second boom part having the second end region, which is designed as a telescopic boom that can be extended in the longitudinal direction of the second boom part, wherein the second boom part is fastened or integrally formed on the first boom part to the side of the first boom part, as seen in the longitudinal axial direction of the first boom part. The two boom parts of the second boom thus perform different tasks. The first boom part provides the connection to the first boom by having the first end region through which the first boom part is connected in an articulated manner to the first boom. The first boom part thus transmits movements of the crane pillar and the first boom to the second boom part. The second boom part is designed as a telescopic boom that can be extended in the longitudinal direction of the second boom part and forms the second end region to which the gripping or cutting head is attached. The second boom part may be attached or molded to the first boom part.

For such an embodiment of the second boom, it is particularly proposed that in the storage position the gripping or cutting head is arranged laterally of the second boom part and the first boom part is pivotable about the second pivot axis below the first boom, wherein the second boom part is arranged between the gripping or cutting head and the first boom part.

A simple structural design as well as a compact arrangement in the bearing position is made possible if the third pivot axis is arranged perpendicular to the second pivot axis.

In particular, it is proposed that the controllable pivoting device is designed as a rotary motor whose axis of rotation forms the third pivot axis. In this way, a space-saving connection of the gripping or cutting head to the second boom is achieved while avoiding hydraulic actuators and the like, wherein precise control of the rotary motor is possible even under load. The stator part of the rotary motor is firmly connected to the second boom, and the rotor part of the rotary motor to the gripping or cutting head.

Furthermore, a truck is proposed which is provided with an apparatus according to the invention. Such an arrangement becomes possible due to the design according to the invention, since it can be brought into a space-saving and compact storage position, in which it hardly exceeds the vehicle width of conventional trucks. The apparatus according to the invention is thus also suitable for transport on the road by conventional truck vehicles.

Figure 1B:
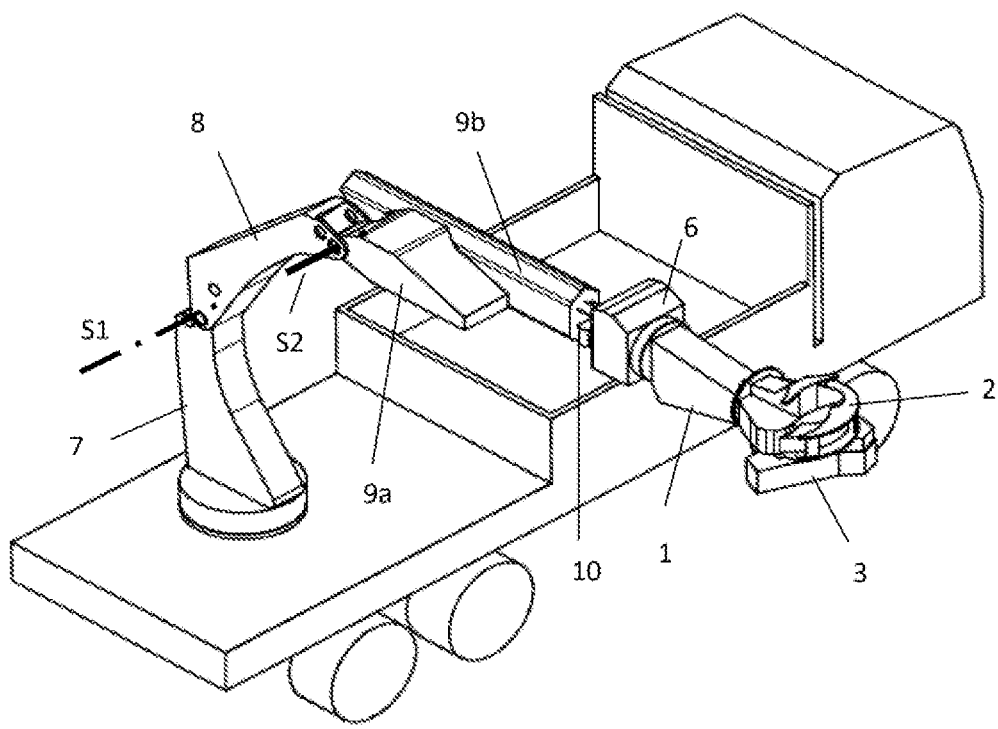
Figure 5A:
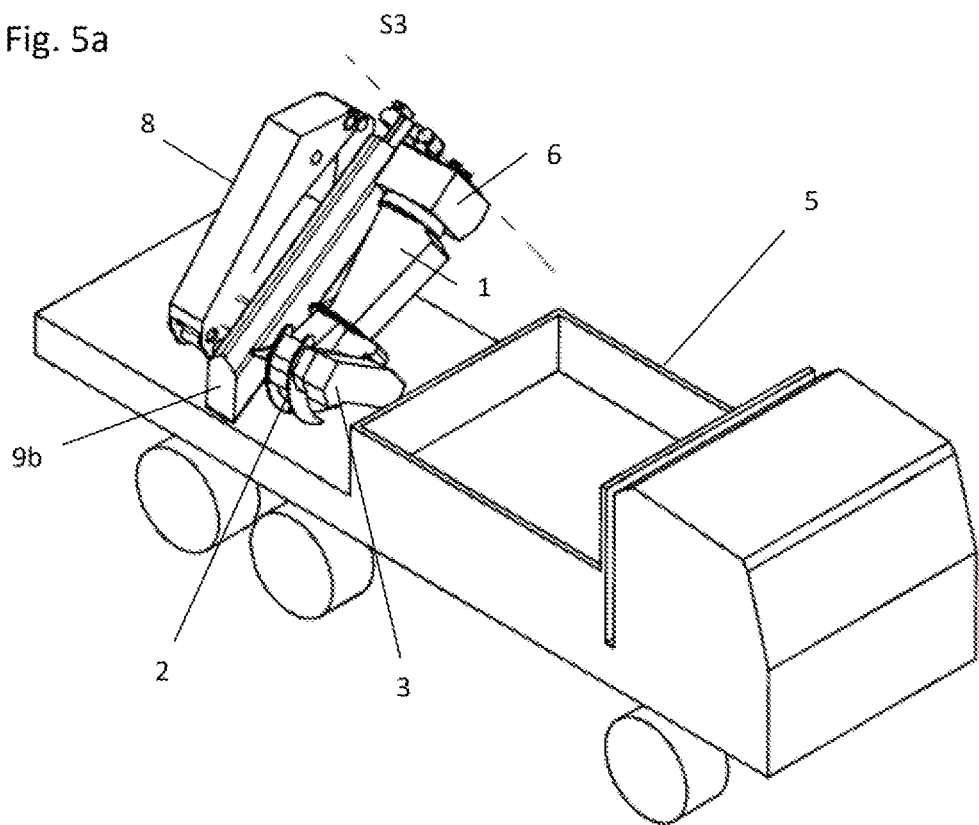
Figure 5B:
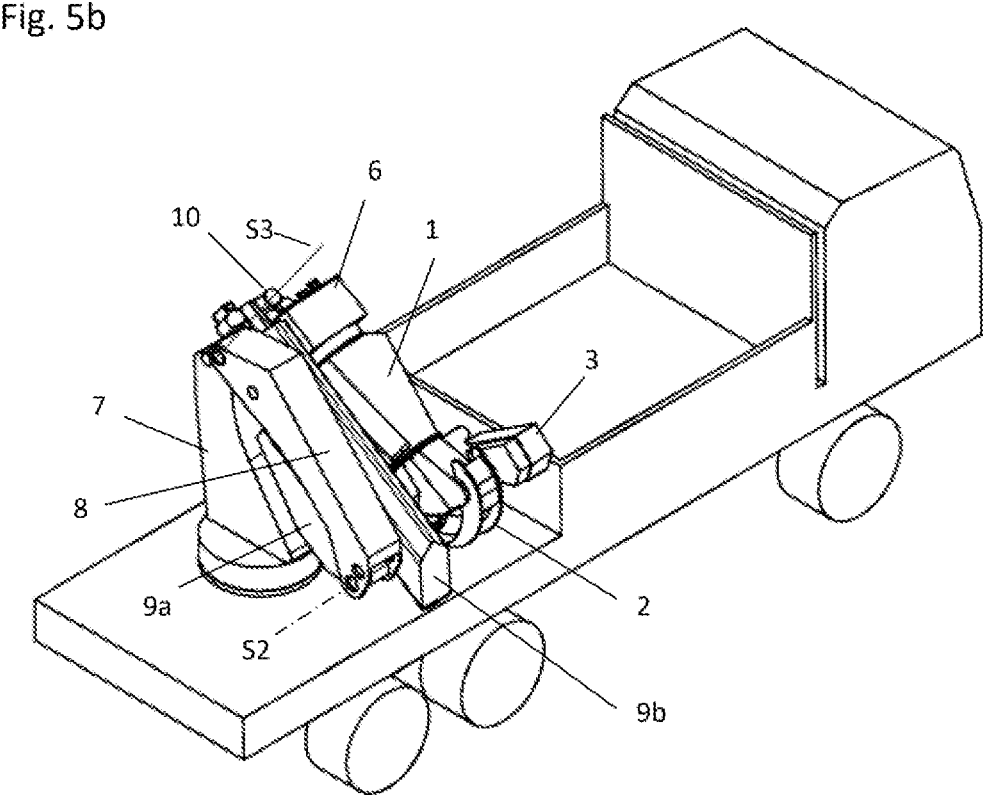

The invention is explained in more detail below by means of exemplary embodiments with the aid of the accompanying figures. The figures show as follows:

FIG. 1a shows a perspective view of a possible embodiment of an apparatus according to the invention in the working position of the gripping or cutting head, wherein the device is arranged on a truck, FIG. 1b shows a further perspective view of the embodiment according to FIG. 1a, FIG. 2 shows a side view of the embodiment according to FIG. 1 in the working position of the gripping or cutting head, FIG. 3 shows a rear view of the embodiment according to FIG. 1 in the working position of the gripping or cutting head, FIG. 4 shows the embodiment according to FIG. 1 as seen from above, both in the working position of the gripping or cutting head and in the (dashed) storage position of the gripping or cutting head, FIG. 5a shows a perspective view of the embodiment of an apparatus according to the invention as shown in FIG. 1 in the storage position of the gripping or cutting head, FIG. 5b shows a further perspective view of the embodiment according to FIG. 1 in the storage position of the gripping or cutting head, FIG. 6 shows a side view of the configuration according to FIG. 5 in the storage position of the gripping or cutting head, FIG. 7 shows a rear view of the configuration according to FIG. 5 in the storage position of the gripping or cutting head, FIG. 8 shows the configuration according to FIG. 5 as seen from above, and FIG. 9 shows a section along the sectional plane A-A of FIG. 6.

With reference to FIG. 1, the structure and function of an embodiment of an apparatus according to the invention with a boom arm and attached gripping or cutting head are first explained. A gripper 2 is attached to a central part 1 of the gripping and cutting head, the gripper arms of which can be closed and opened hydraulically to grip a tree trunk. For reasons of clarity, the hydraulic actuating elements are not shown. Furthermore, a cutting mechanism 3 is attached to the central part 1, which performs the cutting process with additional hydraulic actuating elements. In the exemplary embodiment shown, the cutting mechanism 3 is designed in the form of a power saw that can be moved hydraulically relative to the central part 1 and cuts through the gripped tree trunk. Optionally, furthermore, an additional collecting gripper can be provided, which can also be opened and closed hydraulically. In this case, the operation of the aforementioned hydraulic elements takes place via an operator's cab 4 of a truck 5, on which the boom arm is mounted.

The central part 1 is arranged on a slewing gear 6, by means of which the central part 1 and thus the gripper 2 can be rotated about their own longitudinal body axis independently of movements of the boom arm. Thus, in the embodiment shown, the gripping or cutting head is formed by the central part 1, the gripper 2, the cutting mechanism 3 and the slewing gear 6, and is in itself prior art. FIGS. 1-4 show the gripping or cutting head in the working position, but with the grippers 2 closed, and FIGS. 5-9 show the gripping or cutting head in the storage position. In the working position of the gripping or cutting head as shown in FIGS. 1-4, a tree trunk not shown in FIGS. 1-4 can be encompassed, by the gripper 2, with the gripping or cutting head oriented with a substantially vertical gripper pivot axis and power saw pivot axis. The axis of rotation of the slewing gear 6 is oriented substantially horizontally, as can be seen in FIGS. 1-4. Hydraulic actuation of the cutting mechanism 3 cuts through the tree trunk and holds it in a substantially vertical orientation by the gripper 2. When the severed tree trunk is deposited, the slewing gear 6 is actuated so that the gripping or cutting head is pivoted to a position in which the severed tree trunk is oriented substantially horizontally and can be deposited on the ground or on a loading area of the truck 5 by means of suitable control of the boom arm.

The boom arm has essentially three elements, namely a rotatable crane pillar 7, a first boom 8 and a second boom 9. The two booms 8, 9 are each pivotable about mutually parallel pivot axes S1, S2, which are arranged perpendicular to longitudinal axes of the first boom 8 and the second boom 9, wherein the first pivot axis S1 and the second pivot axis S2 will generally extend substantially horizontally as well as perpendicular to a substantially vertical axis of rotation of the rotatable crane pillar 7 (see FIG. 1b). The two booms 8, 9 may be arranged in a stretched configuration relative to each other and to the crane pillar 7, allowing expansive movements of the boom arm, or they may be laid end to end to adopt space-saving configurations for transportation and storage.

The second boom 9 further comprises a first boom part 9a, as well as a second boom part 9b. The first boom part 9a connects to the first boom 8 via the second pivot axis S2 and transmits movements of the crane pillar 7 and the first boom 8 to the second boom part 9b. The second boom part 9b is designed as a telescopic jib which can be extended in the longitudinal direction of the second boom part 9b and to the extendable end of which the gripping or cutting head is attached.

The gripping or cutting head is attached to the second boom part 9b by means of a controllable pivoting device 10 so that it can pivot about a third pivot axis S3. The controllable pivoting device 10 is designed, for example, as a rotary motor whose axis of rotation forms the third pivot axis S3. The rotary motor enables precise control even under load as well as a space-saving connection of the gripping or cutting head to the second boom part 9b. With the aid of the controllable pivoting device 10, the gripping or cutting head can be pivoted about the third pivot axis S3 from an unfolded working position (see FIGS. 1-4), in which the gripping or cutting head is positioned in front of the second boom part 9b as viewed in the longitudinal axial direction of the second boom part 9b, into a folded-in storage position (see FIGS. 4-9), in which the gripping or cutting head is positioned to the side of the second boom part 9. This makes it possible, after completion of the work, to first bring the gripping or cutting head with the aid of the pivoting device 10 into a folded-in storage position in which the gripping or cutting head is arranged laterally of the second boom 9. Subsequently, the second boom 9 can be pivoted in such a way that the first boom part 9a comes to lie under the first boom 8 (see, for example, FIG. 5b or FIG. 7), wherein the second end region of the first boom part 9a is arranged in the region of the crane pillar 7. Since the second boom part 9b is arranged with the gripping or cutting head folded to the side of the first boom part 9a, this movement is no longer hindered by the gripping or cutting head. Thus, a compact arrangement is achieved in which the gripping or cutting head is arranged laterally of the second boom part 9b and the first boom part 9a has been pivoted about the second pivot axis S2 below the first boom 8, with the second boom part 9b arranged between the gripping or cutting head and the first boom part 9a (see for example FIG. 5b). Such a space-saving and compact arrangement hardly exceeds the vehicle width of conventional trucks, so that such an apparatus can also be arranged on trucks and is also suitable for transport on the road by conventional trucks.

In this way, an apparatus for cutting and/or handling material to be cut, in particular trees, is realized with a gripping or cutting head attached to a pivotable boom arm, which on the one hand can perform expansive movements in use, but on the other hand can also be arranged in a compact and space saving manner for storage and transport.

The invention claimed is:

1. A device for cutting and/or handling trees, comprising:
   a pivotable boom arm to which a gripping or cutting head is attached, wherein the boom arm comprises:
      a rotatable crane pillar,
      a first boom which is pivotably mounted on the rotatable crane pillar about a first pivot axis,
      a second boom having a first end region pivotably mounted on the first boom about a second pivot axis,
      wherein the first and second pivot axes are arranged parallel to one another and perpendicular to longitudinal axes of the first and second booms, and, at a second end region of the second boom remote from the first end region, the gripping or cutting head is pivotably mounted on the second boom about a third pivot axis, and
      wherein the second boom comprises a first boom part having the first end region, and a second boom part having the second end region, which is a telescopic boom which can be extended in a longitudinal direction of the second boom part, wherein the second boom part is fastened or integrally formed on the first boom part to the side of the first boom part, as seen in a longitudinal axial direction of the first boom part, and
      a controllable pivoting device is provided, by means of which the gripping or cutting head can be pivoted about the third pivot axis from a folded-out working position, in which the gripping or cutting head, as seen in a longitudinal axial direction of the second boom, is positioned in front of the second end region, into a folded-in storage position, in which the gripping or cutting head is arranged to a side of the second boom.

2. The device according to claim 1, wherein a pivot angle of a pivoting movement of the gripping or cutting head from the working position to the storage position is between 135° and 180°.

3. The device according to claim 1, wherein, in the storage position, the gripping or cutting head is arranged to a side of the second boom part and the first boom part is pivotable about the second pivot axis below the first boom, wherein the second boom part is arranged between the gripping or cutting head and the first boom part.

4. The device according to claim 1, wherein the third pivot axis is arranged perpendicular to the second pivot axis.

5. The device according to one of claim 1, wherein the controllable pivoting device is a rotary motor having an axis of rotation which forms the third pivot axis.

6. A truck comprising the device according to claim 1.

7. A device for cutting and/or handling trees, comprising:
   a pivotable boom arm to which a gripping or cutting head is attached, wherein the boom arm comprises:
      a rotatable crane pillar,
      a first boom which is pivotably mounted on the rotatable crane pillar about a first pivot axis,
      a second boom having a first end region pivotably mounted on the first boom about a second pivot axis,
      wherein the first and second pivot axes are arranged parallel to one another and perpendicular to longitudinal axes of the first and second booms, and, at a second end region of the second boom remote from the first end region, the gripping or cutting head is pivotably mounted on the second boom about a third pivot axis, and
      a controllable pivoting device is provided, by means of which the gripping or cutting head can be pivoted about the third pivot axis from a folded-out working position, in which the gripping or cutting head, as seen in a longitudinal axial direction of the second boom, is positioned in front of the second end region, into a folded-in storage position, in which the gripping or cutting head is arranged to a side of the second boom,
      wherein the controllable pivoting device is a rotary motor having an axis of rotation which forms the third pivot axis.

8. The device according to claim 7, wherein a pivot angle of a pivoting movement of the gripping or cutting head from the working position to the storage position is between 135° and 180°.

9. The device according to claim 7, wherein the second boom comprises a first boom part having the first end region, and a second boom part having the second end region, which is a telescopic boom which can be extended in a longitudinal direction of the second boom part, wherein the second boom part is fastened or integrally formed on the first boom part to the side of the first boom part, as seen in a longitudinal axial direction of the first boom part.

10. The device according to claim 9, wherein, in the storage position, the gripping or cutting head is arranged to a side of the second boom part and the first boom part is pivotable about the second pivot axis below the first boom, wherein the second boom part is arranged between the gripping or cutting head and the first boom part.

11. The device according to one of claim 7, wherein the third pivot axis is arranged perpendicular to the second pivot axis.

12. A truck comprising the device according to claim 7.

* * * * *